United States Patent [19]

Verner et al.

[11] 4,107,240
[45] Aug. 15, 1978

[54] METHOD AND DEVICE FOR LAKE RESTORATION BY OXYGEN-ENRICHING OF THE WATER

[75] Inventors: Bo Lennart Verner, Stockholm; Lars Börje Staffan Fors, Ingarö, both of Sweden

[73] Assignee: Atlas Copco Aktiebolag, Nacka, Sweden

[21] Appl. No.: 767,882

[22] Filed: Feb. 11, 1977

Related U.S. Application Data

[63] Continuation of Ser. No. 551,930, Feb. 21, 1975, Pat. No. 4,060,574, which is a continuation of Ser. No. 258,546, Jun. 1, 1972, abandoned.

[30] Foreign Application Priority Data

Jun. 1, 1971 [SE] Sweden .............................. 7002/71
Jan. 28, 1972 [SE] Sweden .............................. 972/72

[51] Int. Cl.² .............................................. B01F 3/04
[52] U.S. Cl. .................................. 261/77; 210/221 P;
210/242 A; 261/120; 261/123; 261/124
[58] Field of Search ....................... 261/29, 77, 91, 93,
261/120, 121 R, 122–124, 119 R, 125, 126,
DIG. 27, DIG. 75; 210/220, 219, 15, 221 R,
221 P, 242 R, 242 A

[56] References Cited

U.S. PATENT DOCUMENTS

| 1,619,430 | 3/1927 | Mauran | 261/77 |
|---|---|---|---|
| 2,353,195 | 7/1944 | Sims | 261/77 |
| 2,825,541 | 3/1958 | Moll et al. | 261/124 X |
| 3,183,065 | 5/1965 | De Bolt | 261/124 X |
| 3,193,260 | 7/1965 | Lamb | 261/124 X |
| 3,335,082 | 8/1967 | Ullrich | 210/15 |
| 3,503,593 | 3/1970 | Nelson | 261/93 X |
| 3,547,811 | 12/1970 | McWhirter | 261/93 X |
| 3,643,403 | 2/1972 | Speece | 261/DIG. 75 |
| 3,671,022 | 6/1972 | Laird et al. | 261/DIG. 75 |
| 3,794,303 | 2/1974 | Hirshon | 261/DIG. 75 |

FOREIGN PATENT DOCUMENTS

| 95,365 | 7/1922 | Switzerland | 261/DIG. 75 |
|---|---|---|---|
| 17,267 | 5/1907 | United Kingdom | 261/123 |
| 942,754 | 11/1963 | United Kingdom | 261/DIG. 75 |

*Primary Examiner*—Richard L. Chiesa
*Attorney, Agent, or Firm*—Flynn & Frishauf

[57] ABSTRACT

A method and a device for restoration of lakes by oxygen-enriching of the water. A lake having a depth exceeding 8–10 meters is oxygenated by air-treatment of the lower and colder hypolimnion layer only. Air is introduced into the hypolimnion and is prevented from rising and thereby reach the upper, warmer epilimnion layer by an air-entrapping bell-shaped housing which is located above the air introduction spot. The device comprises a vertical tube the upper end of which terminates within said housing and the lower end of which carries an air nozzle. The tube acts as an air-lift pump by which the water is circulated through the housing. The housing is provided with an air outlet at its uppermost part and water outlets at its lowermost part. To the water outlets there are connected ducts for distributing oxygenated water out over the lake. The outlet ducts are provided with air collecting chambers in which a secondary entrapping of air bubbles takes place. The device also includes stabilizing means as an anchor block and floates.

33 Claims, 4 Drawing Figures

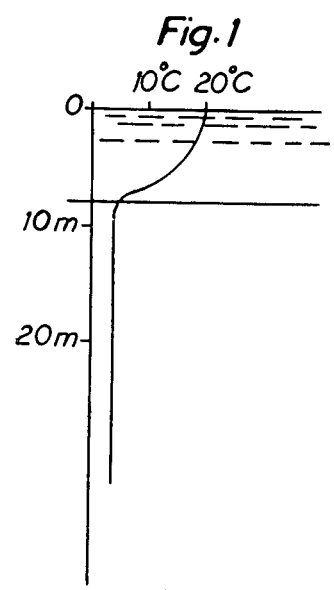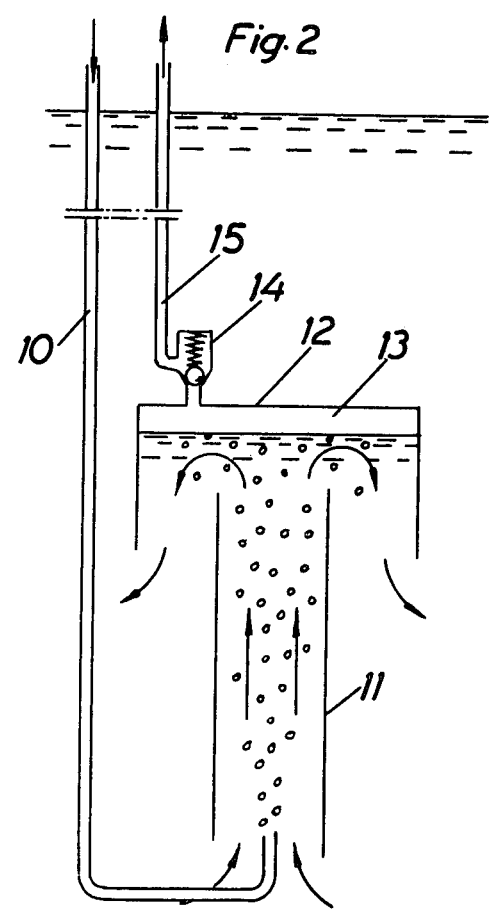

METHOD AND DEVICE FOR LAKE RESTORATION BY OXYGEN-ENRICHING OF THE WATER

This is a continuation of application Ser. No. 551,930, filed Feb. 21, 1975, and now U.S. Pat. No. 4,060,574 which is a continuation of Ser. No. 258,546, filed June 1, 1972, now abandoned.

BACKGROUND OF THE INVENTION

This invention relates to a method and a device for restoration of lakes by oxygen-enriching of the water. More particularly the invention intends to solve the problem of air-treatment of lakes the depth of which exceeds 8 to 10 meters without disturbing of the thermal stratification of the water.

During the summer the water of such lakes is stratified into two different layers one upper warmer layer, epilimnion, and one lower colder layer, hypolimnion. The border between the epilimnion and the hypolimnion layer is situated at a depth of 8 to 10 meters. The surface layer, epilimnion, has good contact with the atmosphere and is thereby able to take up some oxygen. In this upper layer plankton algae produce organic matter with oxygen as a bi-product. When nutrient concentrations in the upper layer are high by nature or by action of man there results a rapid production of organic matter. A large proportion of this matter settles into the lower colder layer where it is broken down by bacteria into its inorganic components. However, these processes will only occur if there is oxygen in the hypolimnion water.

If there is insufficient oxygen for this organic breakedown to occur, nutrient salts will diffuse into the water from the sediment layer at the bottom of the lake during the stagnant summer period. In the following spring circulation these nutrient salts are distributed throughout the bulk of water and thus become available for further organic production. This continual increase in production of organic matter makes the oxygen balance progressively worse and worse and the lake has no possibility to break this development without outside help.

One way to help the lake out of this situation is to supply oxygen to the water. The oxygen shall be supplied to the lower, oxygen consuming and oxygen deficient layer, hypolimnion. Then, it is important that the hypolimnion water is not mixed with the oxygen-rich surface water because a total oxygen deficiency in the lake could be the result.

According to one previously proposed method for oxygen-enriching of a lake hypolimnion water is transported to the surface by means of an air-lift pump and after having been in contact with the atmosphere it is returned to its original depth.

This known method is disadvantageous in requiring a very bulky equipment which is difficult to handle. The air-lift pump has to be at least ten meters high to bridge over the epilimnion layer.

Another disadvantage involved in this method is that the water is brought into contact with air under atmospheric pressure which means a relatively low oxygen solubility.

According to this invention these problems are solved by air-treatment of the water within the hypolimnion itself, which means that oxygen is exposed to the water at the pressure existing in the hypolimnion. If, for instance, oxygen is supplied at a depth of twenty meters the amount soluble oxygen in water is about three times higher than the corresponding amount at the surface. It also means that the device required is much smaller than the previously described air-lift pump. A device for air-treatment of water within the hypolimnion is included in the invention.

BRIEF DESCRIPTION OF THE DRAWINGS

The method and the device according to this invention are described in detail with references made to the drawings.

FIG. 1 illustrates the thermal stratification of the water in a deep lake during summer. The upper layer, epilimnion, has a temperature interval from about 20° at the surface to 4° at about 10 meters depth whereas the lower layer, hypolimnion, has a constant temperature from the 10 meter level further downwards.

FIG. 2 is a schematic view illustrating the water restoration method according to the invention.

DESCRIPTION OF A PREFERRED EMBODIMENT

Figure 3:
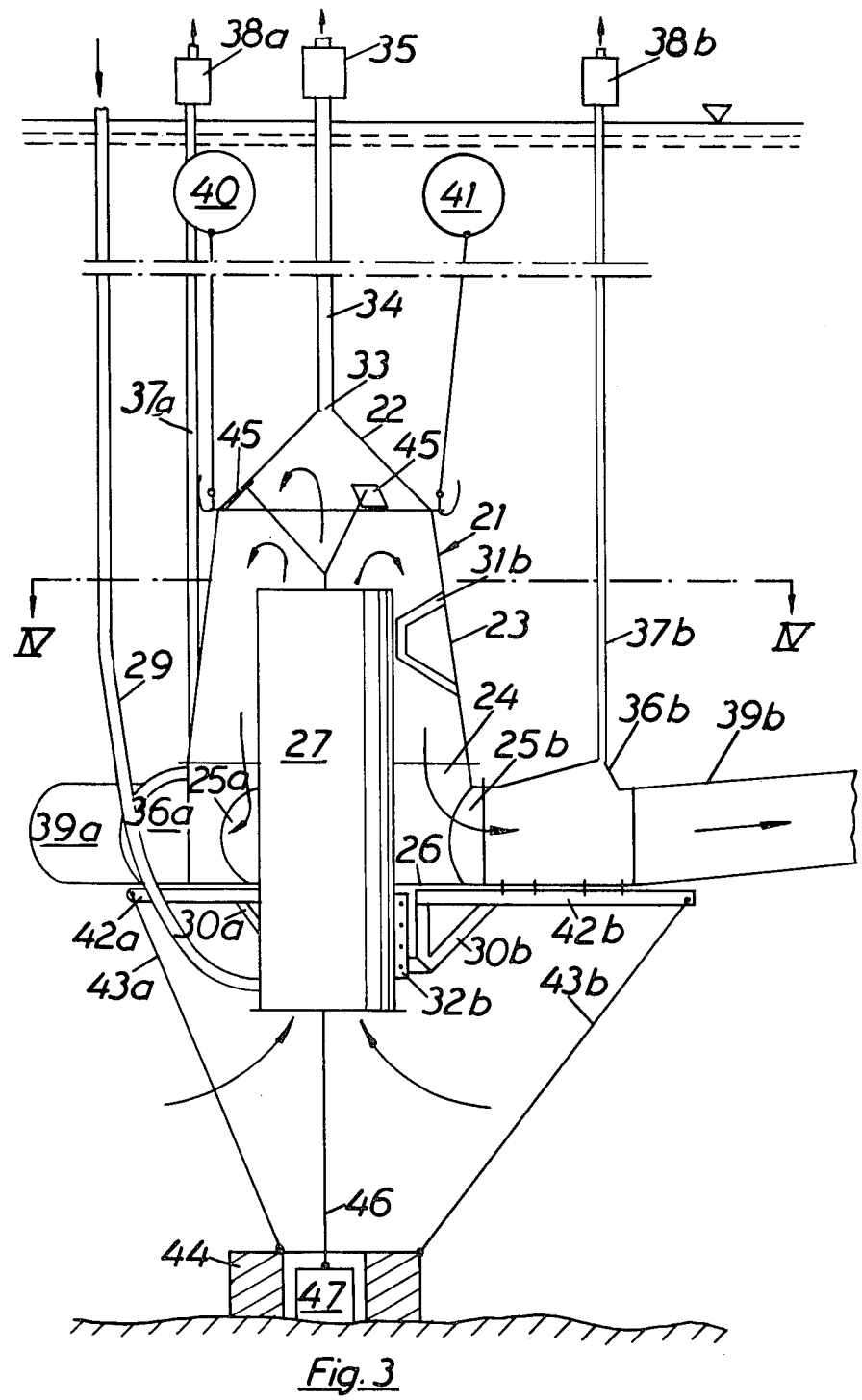
FIG. 3 shows a vertical section of a device according to the invention.

According to the method illustrated in FIG. 2, air is introduced in the hypolimnion through a conduit 10. This conduit terminates at the lower end of a vertically arranged tube 11 which is open at both ends. As air is blown out into the water through conduit 10, bubbles rise up through the tube 11 establishing an air-lift pump. The upper end of the tube 11 is located in a substantially bell-shaped housing 12 the purpose of which is to collect the rising air bubbles. At the uppermost part of the housing 12 there is established an air volume 13 the size of which is controlled by a pressure-sensitive restricting valve 14. Excessive air is drained to the atmosphere through the valve 14 and a conduit 15. The water gets into contact with the rising air bubbles in the tube 11 as well as the air volume 13 in the housing.

The new method means that the water enters the tube 11, rises with the air bubbles through the tube 11, passes the air volume 13 and departs from the housing. It is important that air bubbles are prevented from leaving the housing together with the outlet flow of water because freely rising air bubbles would cause an undesirable upward flow in water which in turn would disturb the thermal stratification of the water.

Figure 4:
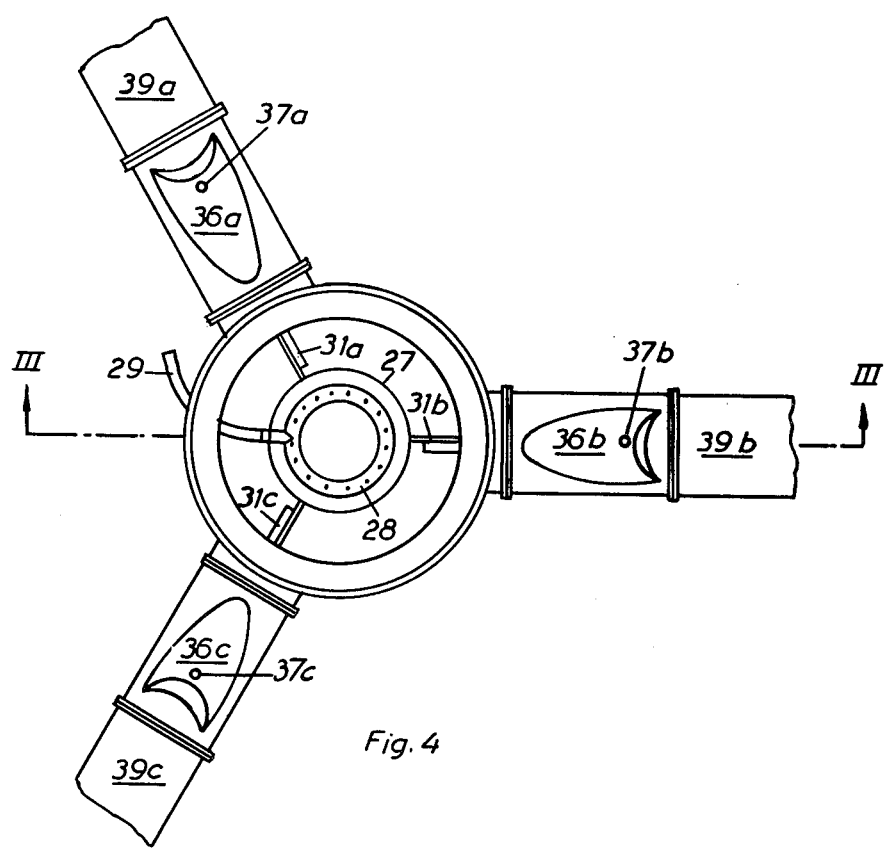
FIG. 4 shows a horizontal section taken along line IV—IV in FIG. 3. The vertical section shown in FIG. 3 is taken along line III—III in FIG. 4.

Referring to FIGS. 3 and 4, a device for oxygen-enriching of water according to the invention will hereinafter be described. The device comprises a housing 21 consisting of an upper part 22, an intermediate part 23 and a lower part 24. The housing 21 has a circular cross section and the upper part 22 and the intermediate part 23 are conical and frustoconical in shape, respectively. The lower part 24 is cylindrical and provided with three radially arranged outlet openings 25a–c. The lower part 24 is provided with a bottom 26 having a central, circular opening. Moreover, the device comprises a tube 27 which is arranged vertically with its upper end inside the housing 21 in level with the intermediate part 23 of the housing and extends downwards through the circular opening.

At the lower end of the tube 27 there is mounted an annular nozzle 28 (see FIG. 4) which is connected to a pressure air source (not shown) via a hose 29.

The tube 27 is attached to three symmetrically disposed brackets 30a-c on the lower part 24 of the housing and is radially supported by three symmetrically disposed guide frames 31a-c mounted on the inside of the housing 21. The attachment of the tube 27 makes it possible to displace the tube 27 axially relative to the housing. For that purpose the tube 27 is provided with axially directed mounting wings 32a-c which are provided with a number of holes for fixing of the tube 27 in different axial positions by means of screw joints. This arrangement makes it possible to vary the annular clearance between the upper edge of the tube and the conical inner wall of the housing 21, whereby the speed of the downwardly directed outlet flow of water could be varied in accordance with the amount of supplied air. This speed must be kept under the air bubble rising speed for avoiding air bubbles to be drawn down with the stream.

The upper part 22 of the housing 21 is formed as an air collecting bell provided with an air outlet 33 which communicates with the atmosphere through a conduit 34 and an adjustable flow control valve 35.

To the outlet openings 25a-c in the lower part 24 of the housing there are connected distributing ducts 39a-c which are provided with air collecting chambers 36a-c each consisting of a tube section having the same diameter as the outlet openings 25a-c and being provided with bell-shaped bulges. The air collecting chambers 36a-c communicate with the atmosphere through conduits 37a-c which are provided with flow control valves 38a-c. The distributing ducts 39a-c may consist of thin-walled plastic tubes which are advantageous by being cheap, light and easy to handle.

The device according to the invention also includes stabilizing means consisting of floats 40 and 41 connected to the upper part 22 of the housing 21 and by radially extending arms 42a-c on the housing 21. These arms 42a-c are connected to an anchor block 44 at the bottom of the lake by means of wires 43a-c or the like.

The device shown in the FIGS. 3 and 4 also includes a safety device comprising valve scuttles 45 disposed in the upper part 22 of the housing 21. By means of a wire 46, these valve scuttles 45 are connected to a dead-weight 47 resting on the bottom of the lake.

The oxygen-enriching device according to the invention is operated from a platform carried by a floating vessel (not shown) on which the compressed air source is located. On the floating platform there is also arranged a hoist by means of which the entire device can be lifted up or lowered down at the installation. The operator's platform does not take part of the invention and for that reason it is not shown in the drawings.

The above described device operates as follows,

In order to oxygenate water by air-treatment the device according to the invention is lowered down into the hypolimnion which is situated at a depth exceeding 8 to 10 meters. The desired depth is obtained by lowering down the device until the anchor block 44 and the dead weight 47 rest upon the lake bottom. The floats 40 and 41 are so dimensioned as to carry the main part of the weight of the device besides the anchor block 44 and the dead weight 47. That means that the floates 40, 41 keep the device in an upright position. The lengths of the wires 43a-c and 46 that connect the device to the anchor block 44 and the dead weight 47 are adapted so as to keep the lower edge of the tube 27 at a distance from the lake bottom of about 2 to 3 meters.

The device starts working as compressed air is supplied to the nozzle 28 from the compressed air source via the conduit 29. The air leaves the nozzle as bubbles which rise through the tube 27 and brings the surrounding water with it. This air lift pump transports the water up through the tube 27 and into the housing 21.

As the air bubbles leave the vertical tube 27 they go on rising and are finally collected and united into an air volume in the upper-most part of the housing 21. Owing to the pressure of the air volume in the upper part 22 of the housing 21 the water has to change direction of flow and go downwards through the annular space between the housing and the vertical tube 27 and further on out through the outlet openings 25a-c. Then, the oxygen-enriched water passes through the air collecting chambers 36a-c in which air bubbles which might have been drawn down with the stream, are allowed to rise and to be collected in the bellow-shaped bulges. Then, the treated water is distributed through the ducts 39a-c over the lake.

The oxygen deficient air which is collected in the upper part 22 of the housing 21 is successively conducted to the atmosphere through the air outlet 33, the conduit 34 and the valve 35. In order to avoid the air outlet conduit acting as an air lift pump the air flow has to be restricted. That is accomplished by the flow control valve 35. This valve 35 is adjusted so as to make the air volume in the housing as small as possible and to keep it constant in size. This flow control is important, because if the back-pressure in the conduit 34 were too low, water would enter the conduit 34 and a second air lift pump would be established. On the other hand, if the back-pressure were too high, the air volume inside the housing would grow and finally reach the point where the water circulation in the housing would stop and, may be, the entire device would rise to the surface.

To avoid rising of the entire device the valve scuttles 45 in the upper part 22 of the housing 21 will be opened immediately as the entire weight of dead-weight 47 is acting upon the wire 46. As the safety scuttles 45 are opened, a large volume of air rapidly escapes from the housing 21, whereby the air volume inside the housing as well as the lifting force acting on the device rapidly decreases.

In the air collecting chambers 36a-c a secondary air bubble collecting takes place. This arrangement insures an efficient separation of air bubbles from the water since those air bubbles which have not been collected in the housing 21 are collected later on in the air collecting chambers 36a-c. Thus, the circulation rate in the housing 21 can be relatively high without risking that air bubbles come out in the hypolimnion. The collected air is drained from the collecting chambers 36a-c through restricting valves 38a-c in the same manner as air is drained from the housing 21.

In the described embodiment of the invention the water levels within the housing 21 and the air collecting chambers 36a-c are controlled by restricting valves which are intended to be adjusted manually so as to obtain desirable sizes of the air volumes. These valve functions may of course be made automatic, for instance by use of floats as sensing means for obtaining a regulation of the air flow in accordance with the water levels.

According to another embodiment of the invention the device have no air collecting chambers in the outlet ducts but is provided with a wider space between the tube 27 and the housing which makes it possible to increase the circulation rate without increasing the velocity of the water flow through the housing. Furthermore, it even makes it possible to decrease the water flow velocity and simultaneously increase the circulation rate. By decreasing the water flow velocity in the housing an almost total collecting of used air is obtained in the housing making a secondary air collecting unnecessary.

The size of the air volume within the housing may be controlled by a means which is sensitive for the weight of the device in the water. In other words, if the air volume within the housing is too large, the lift force acting on the device, balances the weight of the device. In such a case the control valve has to increase the air flow in the outlet conduit so as to diminish the air volume within the housing.

The invention is not limited to the shown embodiments but can be freely varied within the scope of the claims.

What we claim is:

1. A method of enriching the oxygen concentration in a subsurface stratum of a thermally stratified body of water comprising an upper warmer and relatively oxygen-rich epilimnion, an intermediate thermocline and a lower colder relatively oxygen-poor hypolimnion, while maintaining undisturbed the thermal stratification thereof, which method comprises:

(a) positioning a confined open-ended gas and water contact zone in the hypolimnion and extending said contact zone upwardly in the hypolimnion;

(b) passing a stream of pressurized oxygen-containing gas into the lower end of said confined open-ended gas and water contact zone to propel by gas lift pump action in the hypolimnion a column of hypolimnetic water upwardly within said contact zone while simultaneously enriching the oxygen concentration thereof by intense contact of said hypolimnetic water with said pressurized gas;

(c) positioning an upwardly confined collection zone in the hypolimnion above said contact zone and surrounding said contact zone to form an annular outlet zone terminating a predetermined distance below the top of and above said lower end of said contact zone;

(d) entrapping excess propellant in said collection zone to form a gas cushion in said collection zone;

(e) maintaining said contact zone and collection zone buoyant in the hypolimnion by means of at least said gas cushion;

(f) utilizing said gas cushion to cause oxygenated hypolimnetic water from said column and said collection zone to flow downwardly within said annular outlet zone;

(g) introducing the thus oxygen-enriched hypolimnetic water into the hypolimnion of the body of water from the outlet zone;

(h) venting entrapped undissolved gas from said collection zone to the atmosphere at a controlled rate to maintain said gas cushion at a predetermined pressure and volume effective to produce undisturbed downward flow of the oxygen-enriched hypolimnetic water within said outlet zone and inhibit flow of entrapped gas bubbles therein, said predetermined volume being at least large enough that said contact and collection zones are maintained buoyant in the hypolimnion;

(i) subjecting the oxygen-enriched hypolimnetic water to a secondary gas collection step before introducing same into the hypolimnion from the outlet zone; and (j) mooring said contact and collection zones to the bottom of the body of water to locate said contact and collection zones a predetermined distance from the bottom of the body of water.

2. Method according to claim 1 comprising mooring said contact and collection zones to the bottom of the body of water by means of flexible wires.

3. A method of enriching the oxygen concentration in a subsurface stratum of a thermally stratified body of water comprising an upper warmer and relatively oxygen-rich epilimnion, an intermediate thermocline and a lower colder relatively oxygen-poor hypolimnion, while maintaining undisturbed the thermal stratification thereof, which method comprises:

(a) positioning a confined open-ended gas and water contact zone in the hypolimnion and extending said contact zone upwardly in the hypolimnion;

(b) passing a stream of pressurized oxygen-containing gas into the lower end of said confined open-ended gas and water contact zone to propel by gas lift pump action in the hypolimnion a column of hypolimnetic water upwardly within said contact zone while simultaneously enriching the oxygen concentration thereof of intense contact of said hypolimnetic water with said pressurized gas;

(c) positioning an upwardly confined collection zone in the hypolimnion above said contact zone and surrounding said contact zone to form an annular outlet zone terminating a predetermined distance below the top of and above said lower end of said contact zone;

(d) entrapping excess propellant in said collection zone to form a gas cushion in said collection zone;

(e) maintaining said contact zone and collection zone buoyant in the hypolimnion by means of at least said gas cushion;

(f) utilizing said gas cushion to cause oxygenated hypolimnetic water from said column and said collection zone to flow downwardly within said annular outlet zone;

(g) introducing the thus oxygen-enriched hypolimnetic water into the hypolimnion of the body of water from the outlet zone;

(h) venting entrapped undissolved gas from said collection zone to the atmosphere at a controlled rate to maintain said gas cushion in said collection zone at a predetermined pressure and volume to produce undisturbed downward flow of the oxygen-enriched hypolimnetic water within said outlet zone and to inhibit downward flow of entrapped gas bubbles therein, said predetermined volume being at least large enough that said contact and collection zones are maintained buoyant in the hypolimnion; and (j) mooring said contact and collection zones to the bottom of the body of water to locate said contact and collection zones a predetermined distance from the bottom of the body of water.

4. Method according to claim 3 comprising mooring said contact and collection zones to the bottom of the body of water by means of flexible wires.

5. A method of oxygenating a thermally stratified body of water having an upper warmer and relatively oxygen-rich epilimnion and a lower colder relatively oxygen-poor hypolimnion while maintaining the thermal stratification thereof, which method comprises:

(a) positioning a gas and water contact zone in the hypolimnion and extending said contact zone upwardly in the hypolimnion;

(b) passing a stream of pressurized oxygen-containing propellant gas into the lower portion of said gas and water contact zone to propel by gas pump lift action in the hypolimnion a column of the body of water upwardly within said contact zone, while simultaneously enriching the oxygen concentration thereof by contact with said pressurized gas;

(c) positioning a collection zone above said contact zone in the hypolimnion;

(d) entrapping a volume of undissolved gas carried by said column of water in said collection zone;

(e) maintaining said contact zone and collection zone buoyant in the hypolimnion by means of at least said entrapped volume of undissolved gas;

(f) passing said upwardly propelled oxygen-enriched water over the top of said contact zone and downwardly within a confined zone depending from said collection zone to an outlet zone upon impact with said entrapped volume of undissolved gas;

(g) maintaining the entrapped gas volume under a predetermined pressure by venting entrapped undissolved gas from said collection zone to the atmosphere, said predetermined pressure being at least large enough that said contact and collection zones are maintained buoyant in the hypolimnion;

(h) providing outlet means with overlying gas collection chambers coupled to said outlet zone at a level intermediate the top and bottom of said contact zone;

(i) venting residual undissolved gas to the atmosphere from said overlying gas collection chambers;

(j) introducing the thus oxygen-enriched hypolimnetic water into the hypolimnion from said outlet means; and (k) mooring said contact and collection zones to the bottom of the body of water to locate said contact and colleczones a predetermined distance from the bottom of the body of water.

6. Method according to claim 5 comprising venting said entrapped undissolved gas from said collection zone to the atmosphere at a controlled rate to maintain said predetermined pressure.

7. Method according to claim 5 comprising mooring said contact and collection zones to the bottom of the body of water by means of flexible wires.

8. A method of enriching the oxygen concentration in a subsurface stratum of a thermally stratified body of water comprising an upper warmer and relatively oxygen-rich epilimnion, an intermediate thermocline and a lower colder relatively oxygen-poor hypolimnion, while maintaining undisturbed the thermal stratification thereof, which method comprises:

(a) submerging an upwardly confined shell in the hypolimnion of said body of water to provide an upwardly confined zone, and anchoring said shell to the bottom of said body of water;

(b) maintaining a gas cushion within said upwardly confined zone of said shell;

(c) maintaining said gas cushion in controlled communication with the atmosphere by an overlying gas flow-path isolated from the surrounding body of water;

(d) producing a gas lift pump action within a confined upwardly extending pump zone in the hypolimnion by propelling oxygen-containing gas under pressure effective to continuously lift water from below said shell into said gas cushion, to oxygenate the water during lifting thereof as well as when said water is in proximity to said cushion, and to release excess gas into said gas cushion;

(e) maintaining said gas cushion also in communication with the hypolimnion by an underlying water flow-path extending first downwardly from said gas cushion alongside said pump-zone and thereafter outwards into the surrounding hypolimnion at a location spaced from the upper and lower limits of said upwardly confined zone;

(f) maintaining said shell and pump zone buoyant in the hypolimnion by means of at least said gas cushion;

(g) allowing the lifted oxygen-enriched water to sink undisturbed along said water flow-path so as to inhibit gas bubbles from following through said water flow-path at first and then releasing the oxygen-enriched water into the hypolimnion;

(h) maintaining said gas cushion at a predetermined pressure and volume by venting excess gas from said cushion via said overlying gas flow-path, said predetermined volume being at least large enough that said contact and collection zones are maintained buoyant in the hypolimnion; and (i) mooring said shell and pump zone to the bottom of the body of water to locate said shell and pump zone a predetermined distance from the bottom of the body of water.

9. Method according to claim 8, comprising downwardly diffusing the lifted water through said water flow-path annularly around said pump zone, which flow-path is widened in a downward direction.

10. Method according to claim 8, comprising subjecting the oxygen-enriched hypolimnetic water to a secondary gas collection step prior to being released into the hypolimnion; collecting the residual undissolved gas from the secondary gas collection; and thereafter venting the collected residual undissolved gas through a secondary gas flow-path isolated from the surrounding body of water.

11. Method according to claim 8 comprising mooring said shell and pump zone to the bottom of the body of water by means of flexible wires.

12. Apparatus for enriching the oxygen concentration in a subsurface stratum of a thermally stratified body of water having an upper warmer and relatively oxygen-rich epilimnion, an intermediate thermocline and a lower colder relatively oxygen-poor hypolimnion, while maintaining undisturbed the thermal stratification thereof, which apparatus comprises:

(a) an upwardly extending open ended shell located in the hypolimnion, said shell having upper and lower ends;

(b) nozzle means for introducing pressurized oxygen-containing propellant gas into the lower end of said shell to propel by gas lift pump action in the hypolimnion a column of hypolimnetic water upwardly within said shell to thereby increase the oxygen concentration thereof;

(c) collection means located in the hypolimnion above said shell for entrapping excess propellant to form a gas cushion within said collection means;

(d) said collection means extending downwardly around said shell to form an outlet passage surrounding said shell, said collection means terminating a predetermined distance below said upper end and above said lower end of said shell for passing oxygen-enriched hypolimnetic water downwardly through said outlet passage from said gas cushion;

(e) outlet means coupled to said outlet passage and located at a level below said upper end and above said lower end of said shell for reintroducing the downwardly flowing oxygen-enriched hypolimnetic water into the hypolimnion;

(f) venting means coupled to said collection means and in communication with said gas cushion for venting excess undissolved gas produced by said gas lift pump action to the atmosphere to maintain said gas cushion at a predetermined pressure and volume to maintain said shell and collection means buoyant in the hypolimnion under the influence of at least said gas cushion, and to produce substantially undisturbed downward flow of the oxygen-enriched hypolimnetic water within said outlet passage and then through outlet means into the hypolimnion; and (g) mooring means coupled to at least one of said shell and collection means for mooring said shell and collection means to the bottom of the body of water to maintain said shell and collection means buoyantly located a predetermined distance above the bottom of the body of the water.

13. Apparatus according to claim 12 wherein said collection means comprises an outer housing spaced from said shell and extending above said shell to entrap said gas cushion at a level above the upper end of said shell, said gas cushion having its lower extremity above the upper end of said shell.

14. Apparatus according to claim 13 wherein said venting means includes means for venting said excess undissolved gas to the atmosphere at a controlled rate.

15. Apparatus according to claim 12 wherein said venting means includes means for venting said excess undissolved gas to the atmosphere at a controlled rate.

16. Apparatus according to claim 12 wherein said mooring means comprises flexible wires for mooring said shell and collection means to the bottom of the body of water.

17. Apparatus for oxygenating a thermally stratified body of water having an upper warmer and relatively oxygen-rich epilimnion and a lower colder and relatively oxygen-poor hypolimnion without destratification thereof, which apparatus comprises:

(a) an upwardly extending open ended shell located in the hypolimnion, said shell having upper and lower ends;

(b) means for introducing pressurized oxygen-containing gas into the lower end of said shell to propel by gas lift pump action a column of water upwardly within said shell whereby to increase the oxygen concentration of said column of water;

(c) entrapment means located in the hypolimnion above the upper end of said shell for entrapping a volume of undissolved gas;

(d) passage means for passing the oxygen-enriched water downwardly from over the upper end of said shell;

(e) venting means for venting entrapped undissolved gas from said entrapment means to the atmosphere to maintain said volume of undissolved gas under a predetermined pressure effective to maintain said shell and entrapment means buoyant in the hypolimnion under the influence of at least said entrapped volume of undissolved gas, and to cause the oxygen-enriched water to flow downwardly in said passage means;

(f) outlet means coupled to said passage means for receiving the downwardly flowing oxygen-enriched water and introducing it into the hypolimnion;

(g) secondary venting means connected to said oulet means for removing residual undissolved gas to the atmosphere; and (h) mooring means coupled to at least one of said shell and entrapment means for mooring said shell and entrapment means to the bottom of the body of water to maintain said shell and entrapment means buoyantly located a predetermined distance above the bottom of the body of water.

18. Apparatus according to claim 17 wherein said venting means includes means for venting said undissolved gas to the atmosphere at a controlled rate.

19. Apparatus according to claim 17 wherein said secondary venting means includes a conduit extending from said outlet means to the atmosphere.

20. Apparatus according to claim 17 wherein said secondary venting means comprises an overlying gas collection chamber in said outlet means.

21. Apparatus according to claim 17 wherein said mooring means comprises flexible wires for mooring said shell and entrapment means to the bottom of the body of water.

22. Apparatus for oxygenating a thermally stratified body of water having an upper warmer and relatively oxygen-rich epilimnion and a lower colder and relatively oxygen-poor hypolimnion without destratification thereof; which apparatus comprises:

(a) an inner open-ended shell having upper and lower ends and an outer shell surrounding said inner shell, both of said shells being wholly located in the hypolimnion and defining therebetween a downwardly extending annular passage;

(b) said outer shell having a closed upper end which is located at a spaced distance from the upper end of said inner shell to form a chamber;

(c) means for introducing a compressed oxygen-containing gas into the lower end of said inner shell effective to propel hypolimnetic water upwardly therein under simultaneous oxygenation thereof;

(d) venting means coupled to said outer shell for venting undissolved gas from said chamber to the atmosphere to maintain a predetermined pressure therein sufficient to maintain said inner and outer shells buoyant in the hypolimnion by buoyant pressure created at least by said predetermined pressure maintained in said outer shell, and to cause the oxygen-enriched water to flow downwardly in said annular passage;

(e) outlet means connected to said annular passage for passing the oxygen-enriched water into the hypolimnion;

(f) secondary venting means connected to said outlet means for removing residual undissolved gas to the atmosphere; and (g) mooring means coupled to at least one of said inner and outer shells for mooring said shells to the bottom of the body of water to maintain said shells buoyantly located a predetermined distance above the bottom of the body of the water.

23. Apparatus according to claim 22 wherein said venting means includes means for venting said undissolved gas to the atmosphere at a controlled rate.

24. Apparatus according to claim 22 wherein said secondary venting means includes a conduit extending from said outlet means to the atmosphere.

25. Apparatus according to claim 22 wherein said secondary venting means comprises an overlying gas collection chamber in said outlet means.

26. Apparatus according to claim 22 wherein said mooring means comprises flexible wires for mooring said shells to the bottom of the body of water.

27. Apparatus for increasing the oxygen concentration in a subsurface stratum of a thermally stratified body of water having an upper warmer and relatively oxygen-rich epilimnion, an intermediate thermocline and a lower colder relatively oxygen-poor hypolimnion, while maintaining substantially undisturbed the thermal stratification thereof, which apparatus comprises:
(a) a dome;
(b) an upright open ended tube having a length substantially exceeding the width thereof, said tube extending into said dome from below, the lower end of said dome being at a vertical level intermediate the top and bottom of said tube, said dome being disposed annularly spaced from and around the major portion of the length of said tube to provide a downwardly extending passage therebetween;
(c) nozzle means at the lower end of said tube;
(d) outlet means at the lower end of the dome in communication with said downwardly extending passage, said outlet means being spaced downwardly from the top of said tube and upwardly from the lower end of said tube;
(e) mooring means coupled to at least one of said dome and tube for maintaining said dome and tube within the hypolimnion of said body of water at a predetermined distance from the bottom of said body of water and anchored to the bottom of said body of water;
(f) means for bubbling pressurized oxygen-containing gas through said nozzle means to produce a gas lift pump action within said tube effective to maintain thereabove a gas cushion in said dome to continuously lift water from below, through the tube and into said gas cushion to oxygenate the water during lifting thereof as well as within said cushion and to cause the thus lifted water to sink down in said dome and then out through said outlet means;
(g) means including said dome with said gas cushion therein for maintaining said dome and tube buoyant in the hypolimnion;
(h) a conduit connecting said dome to the atmosphere; and
(i) venting means associated with said conduit to vent excess gas from said gas cushion in said dome and to maintain said gas cushion at a predetermined pressure and volume therein.

28. Apparatus according to claim 27 in which the portion of said dome surrounding said tube is widened conically in downward direction.

29. Apparatus according to claim 28 comprising secondary venting means connected to said outlet means for removing residual undissolved gas to the atmosphere.

30. Apparatus according to claim 29 wherein said secondary venting means comprises an overlying gas collection chamber in said outlet means.

31. Apparatus according to claim 27 wherein said mooring means comprises flexible wires for maintaining said dome and tube at said predetermined distance from the bottom of said body of water.

32. Apparatus for increasing the oxygen concentration in a subsurface stratum of a thermally stratified body of water having an upper warmer and relatively oxygen-rich epilimnion, an intermediate thermocline and a lower colder relatively oxygen-poor hypolimnion, while maintaining undisturbed the thermal stratification thereof, which apparatus comprises:
(a) a dome;
(b) an upright open ended tube having a length substantially exceeding the width thereof, said tube extending into said dome from below, the lower end of said dome being at a vertical level intermediate the top and bottom of said tube, said dome being disposed annularly spaced from and around the major portion of the length of said tube to provide a downwardly extending passage therebetween;
(c) nozzle means at the lower end of said tube;
(d) outlet means at the lower end of the dome in communication with said downwardly extending passage, said outlet means being spaced downwardly from the top of said tube and upwardly from the lower end of said tube;
(e) mooring means coupled to at least one of said dome and tube for maintaining said dome and tube within the hypolimnion of said body of water and at a predetermined distance from the bottom of said body of water;
(f) means for bubbling pressurized oxygen-containing gas through said nozzle means to produce a gas lift pump action within said tube effective to maintain thereabove a gas cushion in said dome to continuously lift water from below, through said tube and into said gas cushion to oxygenate the water during lifting thereof as well as within said cushion and to cause the thus lifted water to sink down in said dome and then out through said outlet means;
(g) a conduit connecting said dome to the atmosphere;
(h) venting means associated with said conduit to vent excess gas from said gas cushion in said dome and to maintain said gas cushion at a predetermined pressure and volume therein; and
(i) means including said dome with said gas cushion therein for maintaining said dome and tube buoyant in the hypolimnion;
(j) the lower end of said dome comprising a bottom portion and said outlet means comprising transverse ducts connected to said bottom portion, each of said ducts having an overlying gas collection chamber associated therewith and conduit means for venting said overlying gas collecting chambers effective to eliminate residual bubbles from the water passing through said ducts and into the hypolimnion.

33. Apparatus according to claim 32 wherein said mooring means comprises flexible wires for maintaining said dome and tube at said predetermined distance from the bottom of said body of water.

* * * * *